(12) United States Patent
Busch

(10) Patent No.: US 7,758,098 B2
(45) Date of Patent: Jul. 20, 2010

(54) DEVICE FOR MAKING ACCESSIBLE AND CLOSING AN OPENING IN A VEHICLE BODY

(75) Inventor: Marcus Busch, Edemissen (DE)

(73) Assignee: SMR Patents S.a.r.l., Luxembourg (LU)

( * ) Notice: Subject to any disclaimer, the term of this patent is extended or adjusted under 35 U.S.C. 154(b) by 0 days.

(21) Appl. No.: 11/913,525

(22) PCT Filed: May 3, 2006

(86) PCT No.: PCT/DE2006/000768

§ 371 (c)(1),
(2), (4) Date: Nov. 29, 2007

(87) PCT Pub. No.: WO2006/116991

PCT Pub. Date: Nov. 9, 2006

(65) Prior Publication Data

US 2008/0197660 A1      Aug. 21, 2008

(30) Foreign Application Priority Data

May 3, 2005      (DE) .................. 10 2005 020 982

(51) Int. Cl.
*B60K 15/05*      (2006.01)

(52) U.S. Cl. .................................. 296/97.22; 220/86.2

(58) Field of Classification Search .............. 296/97.22; 220/86.2, DIG. 33
See application file for complete search history.

(56) References Cited

U.S. PATENT DOCUMENTS

| | | | |
|---|---|---|---|
| 5,066,062 A | | 11/1991 | Sekulovski |
| 5,072,986 A | * | 12/1991 | Tai et al. .................. 296/97.22 |
| 6,231,107 B1 | * | 5/2001 | Mukai ..................... 296/97.22 |
| 2005/0134079 A1 | * | 6/2005 | Busch et al. ............. 296/97.22 |
| 2005/0194810 A1 | * | 9/2005 | Beck ....................... 296/97.22 |

FOREIGN PATENT DOCUMENTS

| | | | | |
|---|---|---|---|---|
| DE | 4425838 | A1 | 1/1996 | |
| DE | 4440814 | A1 | 5/1996 | |
| DE | 19935454 | A1 | 3/2001 | |
| EP | 1449702 | A2 | 8/2004 | |
| EP | 1449702 | A2 * | 8/2004 | |
| JP | 406206457 | A * | 7/1994 | .............. 296/97.22 |

* cited by examiner

*Primary Examiner*—Jason S Morrow
(74) *Attorney, Agent, or Firm*—Reising Ethington P.C.

(57) ABSTRACT

The invention relates to a device for making accessible and closing an opening in a vehicle body, especially a filler neck compartment. According to the invention, a closing part is first displaced out of the body plane and then parallel to the vehicle body via two moving devices in order to make accessible a filler neck, for example.

11 Claims, 1 Drawing Sheet

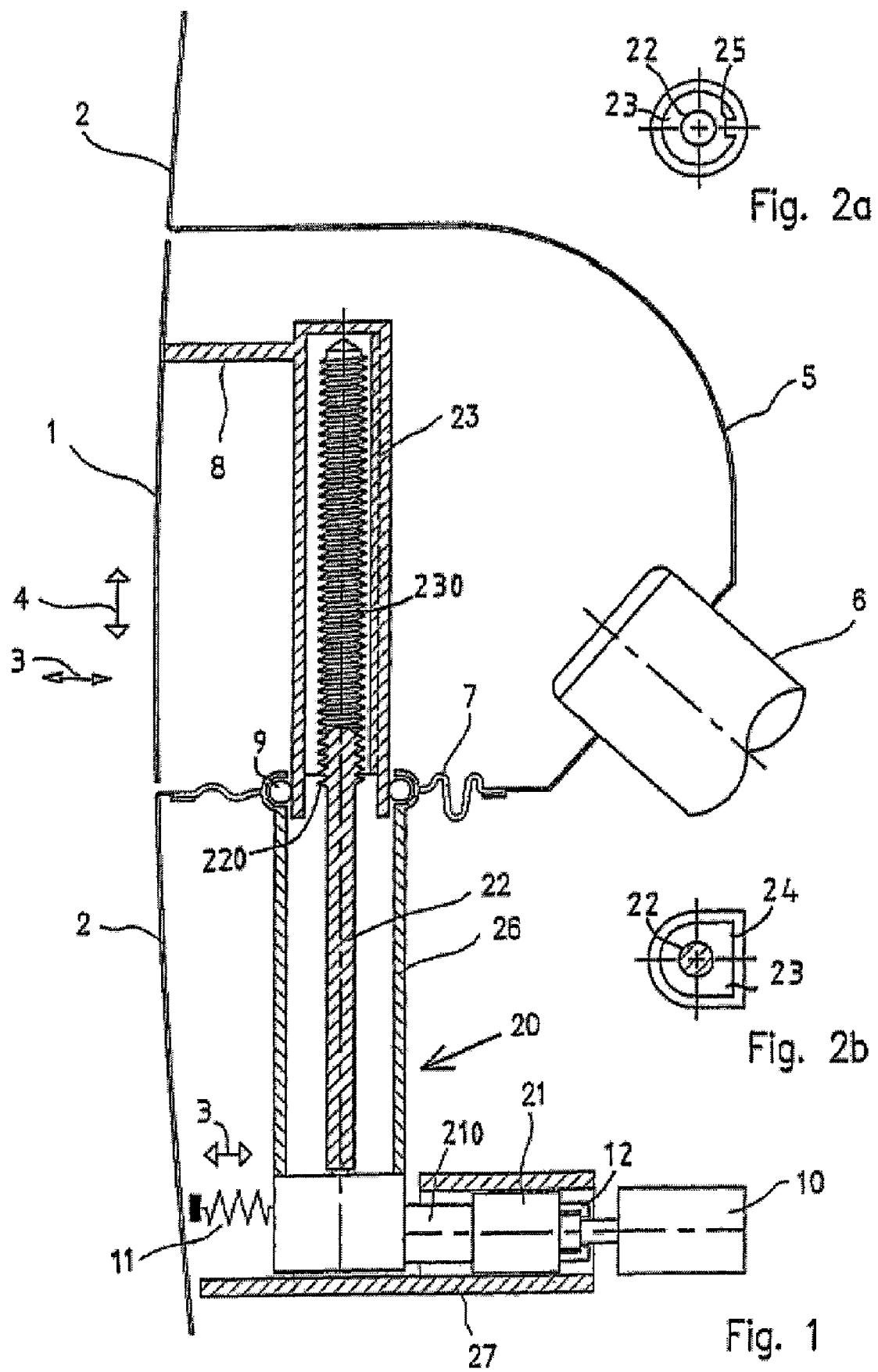

DEVICE FOR MAKING ACCESSIBLE AND CLOSING AN OPENING IN A VEHICLE BODY

BACKGROUND OF THE INVENTION

The invention is based on a priority patent application DE 10 2005 020 982.3, which is hereby incorporated by reference.

The invention relates to a device for making accessible and closing an opening in a vehicle body, in particular a filler neck compartment with a closing part.

From the state of the art, it is known to close filler neck compartments through a pivotally supported filler neck compartment door. These pivot able filler neck compartment doors require a certain installation space, in order to be mounted to the vehicle body. Furthermore, the filler neck compartment door is open during refueling, which can mean that the filler neck compartment door protrudes beyond the vehicle contour, when closing the filler neck compartment door is omitted. Furthermore, the installation can be very confined, when the filler neck is disposed within the B-column, so that a hinged solution is out of the question.

Based on this state of the art, the invention is based on the objective to provide a device for making accessible and closing an opening in a vehicle body, which avoids the disadvantages of the state of the art, and through which a safe closure of the axis opening is also possible when the installation space is restricted.

SUMMARY OF THE INVENTION

According to the invention, this object is accomplished through a device for making accessible and closing an opening in a vehicle body, especially a filler neck compartment, through a closing part of a moving device for moving the closing part in a first moving direction perpendicular to the vehicle body, and a moving device for moving the closing part in a second moving direction parallel to the vehicle body and perpendicular to the first moving direction, wherein the closing part is connected with a longitudinally moveable sleeve in a rigid and offset manner, through providing a movement device for moving the closing part in a first movement direction perpendicular to the vehicle body, in order to move the closing part, which is flush with the vehicle body in closed state, out of this plane. Through the movement device or through a second movement device, the closing part is moved in a second movement direction parallel to the vehicle body and perpendicular to the first movement direction, so that the closing part, which is disposed substantially parallel to the vehicle body, and which is moved out in the first movement direction, can be moved in parallel to the vehicle body, in order to uncover the opening, which is covered by the closing part. Through the subsequent movement of the closing part in different directions, which are perpendicular to each other, the closing part can be moved rather tight along the vehicle body, and can be moved in parallel, so that the closing part abuts very closely to the vehicle body or protrudes beyond it in closed state. Such a device is also usable under restricted installation conditions, when there is little space for hinge- and locking devices of a filler neck compartment door.

The movement device or the movement devices can be provided as lift magnet or as an electric motor, wherein the two drives can also be used combined with each other, thus, so that the first movement device is provided as a lift magnet and the second movement device is provided as an electric motor. Besides a motoric or electromagnetic drive, it is provided to be able to drive the movement devices manually, so that an emergency operation is possible, should the energy supply fail.

A refinement of the invention provides that the second movement device is provided as an electric motor, which is coupled with the closing part through a spindle. Thereby, it is possible to provide more freedom with respect to the disposition of the movement devices, relative to the closing part. Through providing the spindle with different lengths, the motor or the crank for operating the spindle can be disposed at almost any locations in the body. As an alternative to providing it as a spindle, the motor can also be coupled to a closing part through a flexible shaft, or through another suitable force transfer device.

Advantageously, the second movement device is coupled with the first movement device, so that the second movement device is moved perpendicular to the vehicle body. This has the advantage, that the second movement device can be connected to the closing part in a rigid manner, relative to the first movement device. Thus, the closing part is moved out of the plane of the vehicle body through the second movement device. The closing part and the second movement device thus form an assembly, which can be moved in the first movement direction.

In order to facilitate the installation of the device for making accessible or closing the opening, it is provided, that the movement device or the movement devices are formed as a common module, in particular as an encapsulated module, in order to thus protect the movable mechanical or electrical or electronic components from the environment outside of the vehicle body. For the case of providing it as a filler neck compartment door, it is provided, that no unsealed connection between the filler neck compartment and the movement devices exists.

In an embodiment of the invention, it is provided, that the closing part is coupled through a longitudinally movable torque proof sleeve with a rotationally mounted, in particular motor driven spindle, or movable shaft. The sleeve has the advantage, that due to the inner thread, a conversion of a rotating motion into a longitudinal motion is facilitated. Furthermore, the sleeve serves as cover of the spindle or of the drive shaft. In order to avoid a co-rotation of the sleeve, it is supported torque proof but longitudinally movable through a guide groove or a guide surface at the outer surface of the sleeve.

In order for the closing part to be able to slide along in parallel to the vehicle body, the closing part is connected to the sleeve through a bar, in order to provide an intermediary space between the sleeve and the closing part, into which the vehicle body or the outer sheet metal can penetrate.

The spindle or the shaft is preferably supported in housing, which is movable together with the sleeve in the first movement device. The housing is used, on the one hand, for supporting and guiding the spindle and also the sleeve, on the other hand, for sealing and module formation relative to environmental impacts. Between the housing and sleeve, a seal is provided. A seal is also provided between the housing and the filler neck compartment, wherein the latter seal allows the movement of the housing in the first movement direction. The seals serve the purpose of protecting the device relative to environmental impacts and contamination.

In order to facilitate an easy moving capability of the second movement device along the first movement direction, the entire second movement device is supported on a slide, so it can slide or roll. The slide is thereby oriented, so that the second movement device is moved perpendicular and away from the vehicle body, or perpendicular towards the vehicle.

BRIEF DESCRIPTION OF THE DRAWINGS

Subsequently, an embodiment of the invention is illustrated in more detail, based on the appended figures. It is shown in:

FIG. 1 a schematic illustration of the device; and

FIGS. 2a and 2b variations of a torque proofing device.

DETAILED DESCRIPTION OF THE DRAWINGS

FIG. 1 schematically shows a cut through a vehicle in the area of a filler neck 6, which is disposed in a filler neck compartment 5, which is closed through a closing part 1. The closing part 1 in the illustrated, closed position substantially closes flush with the vehicle body 2. In order to make the filler neck 6 accessible for filling, the closing part 1, in this case the filler neck compartment door is initially moved in a first moving direction 3, away from the vehicle body 2, in order to be able to be subsequently moved in the second moving direction 4 downward. Through the two-stage, possibly superimposed movement, away from the vehicle body 2, and in parallel to the vehicle body 2, downward, it is facilitated that the closing part 1 can be moved very close and in parallel to the vehicle body 2, and to open the filler neck compartment 5, in order to make the filler neck 6 accessible for a filling process.

The movement of the closing part 1 in the moving directions 3, 4 is caused by two moving devices 10, 20, each causing a moving component of the opening, or closing movement of the closing part 1. In the illustrated embodiment, the first movement device 10 is provided as a lift magnet, which moves the second moving device 20 together with the closing part 1 along the first moving direction 3. The moving through the first moving device 10 is thus performed based on an electric impulse, e.g. through a remote control unit, or through an operating element in the interior of the passenger compartment. Through the operation of the lift magnet 10, the entire second moving device 20 is moved together with the closing part 1, wherein the second moving device 20 is supported on a slide 27, so that it can slide.

The second moving device 20 has an electric motor 21, which transfers the rotating movement of the drive shaft through a respective teething to the spindle 22. The spindle 22, in turn, transfers the rotation through a threaded pairing to a sleeve 23, which is supported torque proof and longitudinally movable, and at which the closing part 1 is connected through a bar 8. The spindle 22, and also the sleeve 23 are supported in a housing 26, which is movably mounted at the filler neck compartment 5 through a seal 7. The seal 7 is thus provided, so that a movement of the housing 26 in the first moving direction 3 is possible to a sufficient extent.

In FIG. 1, it is furthermore shown, that the lift magnet 10 is mounted to the electric motor 21 through a ram 12, so that a movement away from the vehicle body 2, which is not shown, and also towards the vehicle can be imitated in the first movement direction 3. In order to avoid an active backward movement by the lift magnet 10, a spring 11 can be disposed at an end of a motor 21, disposed opposite to the lift magnet 10, which automatically causes a movement towards the vehicle body 2 when the power of the lift magnet 10 is cut off in order to keep the closing part 1 substantially flush with the vehicle body 2. As an alternative to a lift magnet, the moving device 10 can also be provided as an electric motor, causing a displacement of the second movement device 20 through a threaded device.

The second moving device 20 performs the movement in the second moving direction 4 through an electric motor 21 being in engagement with a rotatably supported spindle 22 and driving it through an output shaft 210. At the upper end of the spindle 22, which can also be alternatively provided as a flexible shaft, which is directly driven by the electric motor 21, an outer thread 220 is disposed, which is provided as a movement thread. This outer thread 220 engages into an inner thread 230 of the sleeve 23 and causes a longitudinal movement of the sleeve 23 according to the rotation direction of the spindle 22.

In order to avoid a co-rotation of the sleeve 23, a guidance either through a guide sleeve 25 or a guide surface 24 is provided, as shown in the sectional views of the FIGS. 2a and 2b. In order the seal the sleeve 23 an O-ring 9 is provided, which prevents that dirt or other materials penetrate up to the electric motor 21. The O-ring 9 is disposed in the housing 26 in a respective cut out. The housing 26 is sealed relative to the filler neck compartment 5 by a seal 7, wherein the seal 7 is provided so that a movement is possible through the amplitude of the first movement device 10. The guide groove 25 or the guide surface 24 are provided at the outside of the sleeve 23, corresponding guide stones or guide surfaces are provided at the inside of the housing 26. The motor 21 with the spindle 22, the sleeve 23, or the housing 26 are moveable together, so that they can be prefabricated as a modular unit. The module can be expended by the first movement device 10, so that a complete device can be delivered pre-assembled.

As already described in connection with FIG. 1, the closing part 1 is supported in a rigid and offset manner through a bar 8 at the sleeve 23, so that the vehicle body 2 or the outer sheet metal can penetrate between the closing part 1 and the sleeve 23.

As an alternative to a motor drive the moving devices 10, 20 can also be manually driven, e.g. by cranks or levers. The driving can also be performed through the electric motor 21 and a flexible shaft, instead of a rigid spindle in order to cause the longitudinal movability of the sleeve 23.

What is claimed is:

1. A device for making accessible and closing a filler neck compartment of a vehicle body through a closing part of a first moving device for moving the closing part in a first moving direction perpendicular to the vehicle body, and a second moving device for moving the closing part in a second moving direction parallel to the vehicle body and perpendicular to the first moving direction, wherein each of said first and second moving devices include electromechanical devices consisting of a lift magnet and an electric motor and the closing part is connected with a longitudinally moveable sleeve in a rigid and offset manner.

2. A device according to claim 1, wherein said second moving device is provided as electric motor, which is coupled with the closing part through a spindle.

3. A device according to claim 1, wherein said second moving device is coupled with the first moving device, so that the second moving device is moved perpendicular to the vehicle body.

4. A device according to claim 1, wherein the moving devices are provided together as a module.

5. A device according to one of the preceding claims, wherein the closing part is coupled through a longitudinally moveable torque proof sleeve with a rotatably mounted, motor driven spindle.

6. A device according to claim 5, wherein the sleeve is supported through a guide groove, or a guide surface at the outside of the sleeve.

7. A device according to claim 5, wherein the closing part is mounted to the sleeve through a bar.

8. A device according to claim 2, wherein the spindle is supported in a housing.

9. A device according to claim 8, wherein a seal is disposed between the sleeve and the housing.

10. A device according to claim 8, wherein the sleeve is guided in the housing.

11. A device according to claim 1, wherein the second moving device is supported on a slide.

* * * * *